United States Patent [19]

Long

[11] Patent Number: 5,655,512

[45] Date of Patent: Aug. 12, 1997

[54] FUEL VALVE FOR A CAMPSTOVE

[75] Inventor: Norris R. Long, Wichita, Kans.

[73] Assignee: Wilson Sporting Goods Co., Chicago, Ill.

[21] Appl. No.: 644,112

[22] Filed: May 10, 1996

[51] Int. Cl.⁶ .................................................. F24C 5/02
[52] U.S. Cl. ........................ 126/44; 431/123; 431/247; 431/210
[58] Field of Search .................................. 431/247, 123, 431/210; 126/44

[56] References Cited

U.S. PATENT DOCUMENTS

Re. 29,457  10/1977  Hastings .
3,876,364   4/1975   Hefling .
4,522,582   6/1985   Curtis .

Primary Examiner—Carroll B. Dority

[57] ABSTRACT

A fuel control assembly for a campstove includes a valve stem which is rotatable 180° within a valve body between open and closed positions. A pin on the valve body extends into a helical slot in the stem for moving the valve stem axially as the valve stem rotates. The stem includes first and second side surface portions which are engageable with a follower member which extends perpendicularly to the rotational axis of the stem. The second side surface portion extends radially outwardly beyond the first side surface portion. The follower member is engageable with a valve for opening the valve as the follower pin is engaged by the second side surface portion of the stem.

7 Claims, 2 Drawing Sheets

FUEL VALVE FOR A CAMPSTOVE

BACKGROUND AND SUMMARY

This invention relates to a fuel valve for a liquid fuel campstove.

A liquid fuel campstove generally includes a fuel tank, a fuel conduit including a generator tube, and a burner assembly which is supplied with fuel by the fuel conduit. A fuel valve in the fuel conduit opens and closes the fuel passage in the conduit. The valve is operated by a control knob, and the control knob conventionally rotates about two full turns between closed and fully open positions.

U.S. Reissue Pat. No. 29,457 describes a fuel valve in which the control knob rotates about 90° between the closed position and a light position, another 30° between the light position and the fully open position, and another 60° from the fully open position to a low position.

U.S. Pat. No. 4,552,582 describes a lantern which includes a valve core for opening and closing fuel flow to the burner.

The invention provides a valve assembly for a liquid fuel campstove which moves from the off position to a fully open position in one-half turn or 180°. The valve includes a valve stem which rotates within a valve body. A pin on the valve body extends into a helical slot in the valve stem, and the valve stem moves axially as it rotates. When the valve stem is rotated from the off position, a camming surface on the valve stem engages a valve core to open the valve core. A rod extends axially from the valve stem, and a needle on the end of the rod meters fuel flow through a fuel orifice as the valve stem and rod move axially.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
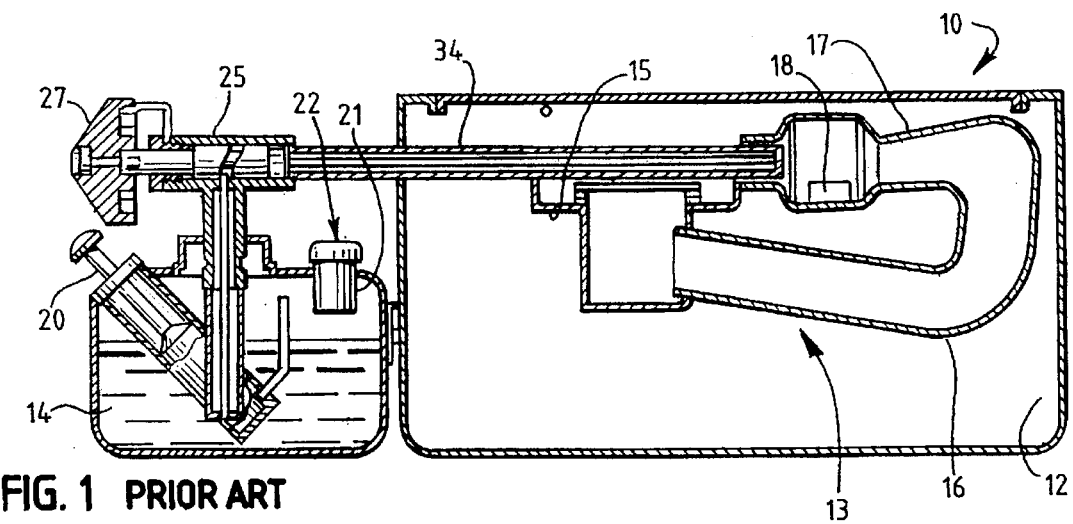
FIG. 1 is a sectional view a prior art campstove.
Figure 2:
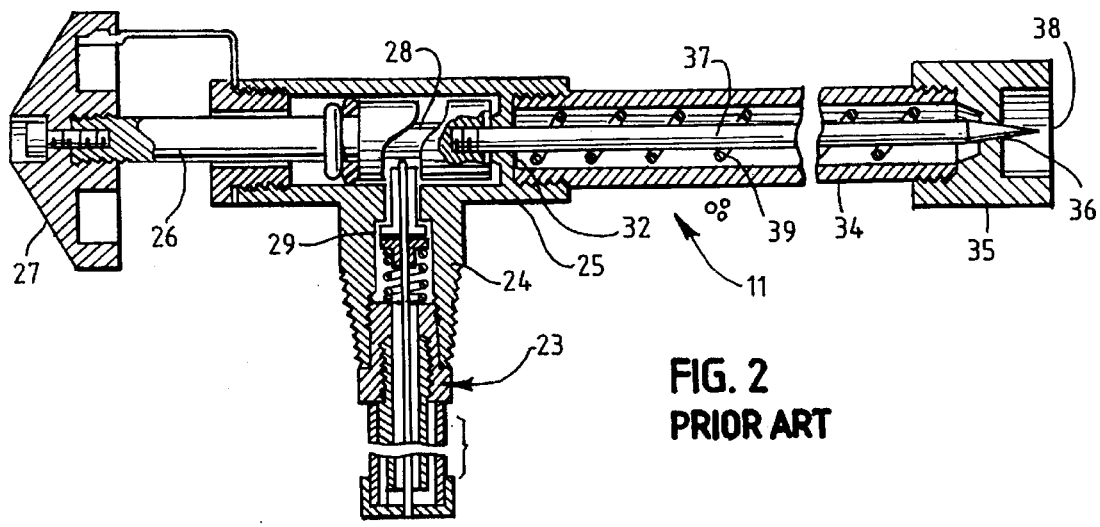
FIG. 2 is an enlarged fragmentary sectional view of the prior art campstove of FIG. 1.

FIGS. 1 and 2 illustrate a campstove 10 and a valve assembly 11 which are described in U.S. Reissue Pat. No. 29,457. The campstove includes a burner housing or case 12 which supports a burner assembly 13 and a fuel tank 14. The burner assembly includes a burner 15 which is supplied with a mixture of fuel and air by a pipe 16 which is connected to a venturi tube 17 and an air opening 18.

The fuel tank 14 is equipped with a manual pump 20 for pressurizing the air in the fuel tank above the fuel level. The fuel tank may be filled through a spout 21 which is covered by a removal cap 22.

Referring to FIG. 2, a fuel pickup tube assembly 23 is connected to a valve assembly 24 which includes a generally T-shaped valve housing 25. A generally cylindrical valve stem 26 is rotatably mounted within the valve housing and is rotatable by a control knob 27. The valve stem is provided with a groove 28 which receives a guide pin 29. As the valve stem rotates, the guide pin 29 causes the valve stem to move axially within the valve body. In the position illustrated in FIG. 2, the valve assembly is closed by the engagement between a gasket on the forward end of the valve stem and annular valve seat 32 on the valve housing. Counterclockwise rotation of the valve stem causes the valve stem to move axially to the left to open the valve.

A generator tube 34 extends from the valve body 25 over the burner 15, and a gas tip 35 on the end of the generator tube is provided with a fuel orifice or jet 36. A rod 37 is secured to the valve stem and extends axially within the generator tube. The rod terminates in a pointed end 38 which extends through the fuel orifice 36. A wire helix 39 is positioned within the generator tube to facilitate heat transfer from the wall of the generator tube to the fuel passing therethrough.

Additional details of the structure and operation of the valve assembly can be found in Reissue Pat. No. 29,457.

FIGS. 3–6 illustrate a valve assembly 45 which is designed to replace the valve assembly 24 of FIGS. 1 and 2. The valve assembly 45 includes a generally cylindrical valve body 46 which has a cylindrical bore 47. A generally cylindrical valve stem 48 is rotatably mounted within the bore. An internally threaded cap 49 is mounted on the end of the valve body, and the valve stem extends through an opening in the cap.

The valve stem 48 is provided with a pair of annular grooves 50 for O-rings 51 which sealingly engage the valve body 46. A helical or spiral slot 52 extends around the forward portion of the valve stem.

A pin 53 (FIG. 4) is mounted on the valve body and extends generally radially inwardly into the helical slot in the valve stem. When the valve stem is in the position illustrated in FIG. 3, the pin engages the rear end 54 of the slot. As the valve stem is rotated counterclockwise from the FIG. 3 position, the pin causes the valve stem to move axially to the left. The valve stem can be rotated one-half turn or 180° until the pin engages the front end 55 of the helical slot. A control knob, not shown, is mounted on the outer end of the valve stem for rotating the valve stem.

The forward portion of the valve stem includes a cylindrical side surface 56 and a relieved or notched portion 57 which provides a flat surface 58. The flat surface 58 is positioned radially inwardly from the cylindrical surface 56.

A generally cylindrical bushing 60 is mounted in an opening in the valve body and extends perpendicular to the bore 47 of the valve body and the valve stem 48. A fuel pickup tube 61 is secured within the bushing 60 for conveying fuel to the valve body.

A conventional tire valve core or Schrader valve 63 is mounted in the upper end of the fuel pickup tube 61. The valve core includes an elongated housing 64, a valve seal 65 which is movable axially relative to the valve housing, and a stem or pin 66 which is connected to the valve seal. A spring inside of the valve housing biases the valve seal upwardly against a valve seat on the lower end of the housing to close the valve. When the stem 66 is depressed, the valve seal 65 moves away from a valve seat and opens the passage through the valve housing.

A cam follower pin 68 is mounted within a cylindrical bore 69 of the bushing 60 and is engageable with the valve stem 48 and the pin 66 of the valve core. When the pin 53 is positioned at the rear end 54 of the helical slot 52 of the valve stem, the cam follower pin 68 engages the flat surface 58 of the valve stem, and the spring-biased valve pin 66 is maintained in an extended position by the force of the spring and the valve seal 65 closes the valve core. As the valve stem 58 is rotated counterclockwise, the cam follower pin 68 is engaged by the cylindrical surface 56 of the valve stem, and the cam follower pin 68 is cammed downwardly by the cylindrical side surface to depress the valve pin 66 and the valve seal, thereby opening the valve core. The cam follower pin 68 is moved downwardly to open the valve core during the first approximately 20° of counterclockwise rotation of the valve stem. The valve core 63 is an on-off valve and does not regulate flow of fuel.

Figure 3:
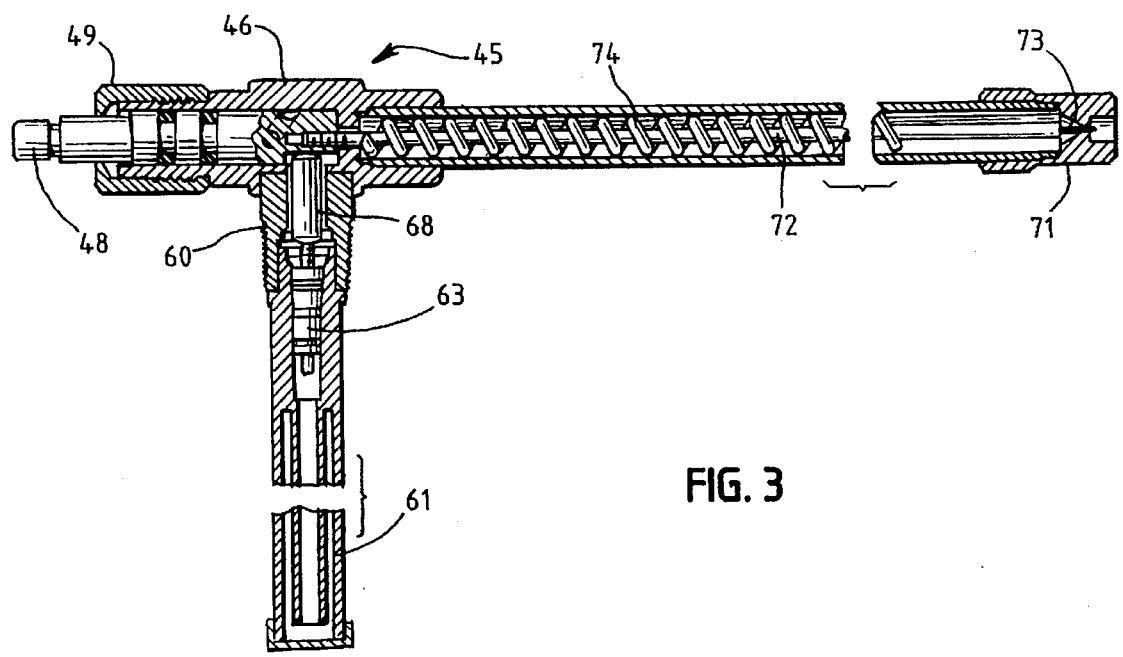
FIG. 3 is a fragmentary sectional view of a valve assembly formed in accordance with the invention.
Figure 4:
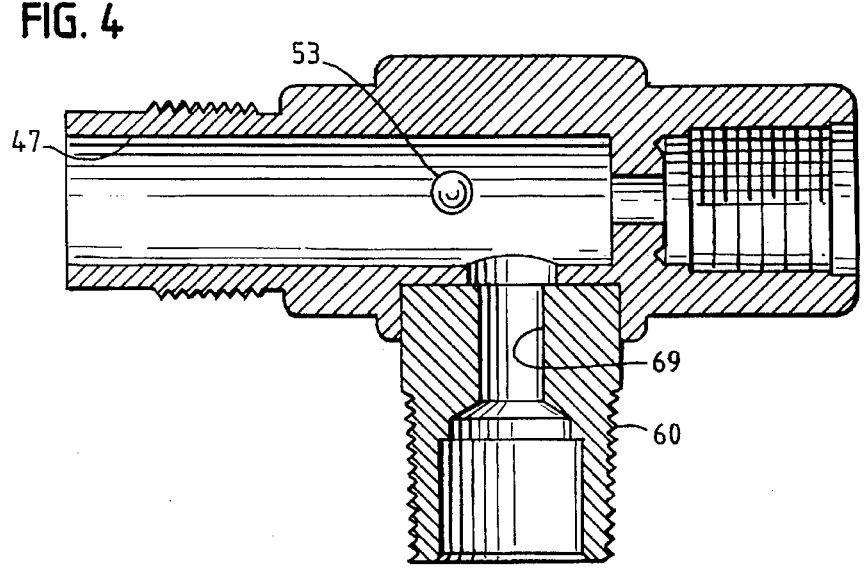
FIG. 4 is a sectional view of the valve body of the valve assembly.
Figure 5:
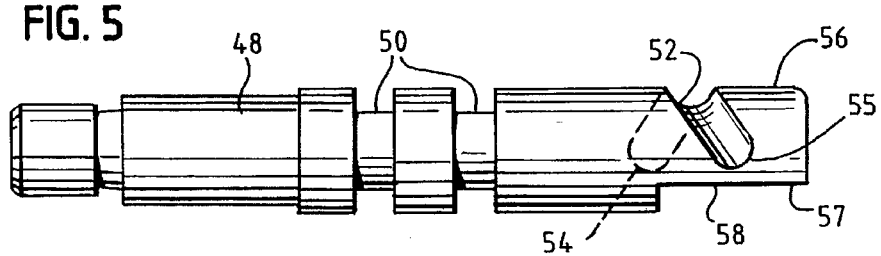
FIG. 5 is a side view of the valve stem of the valve assembly.
Figure 6:
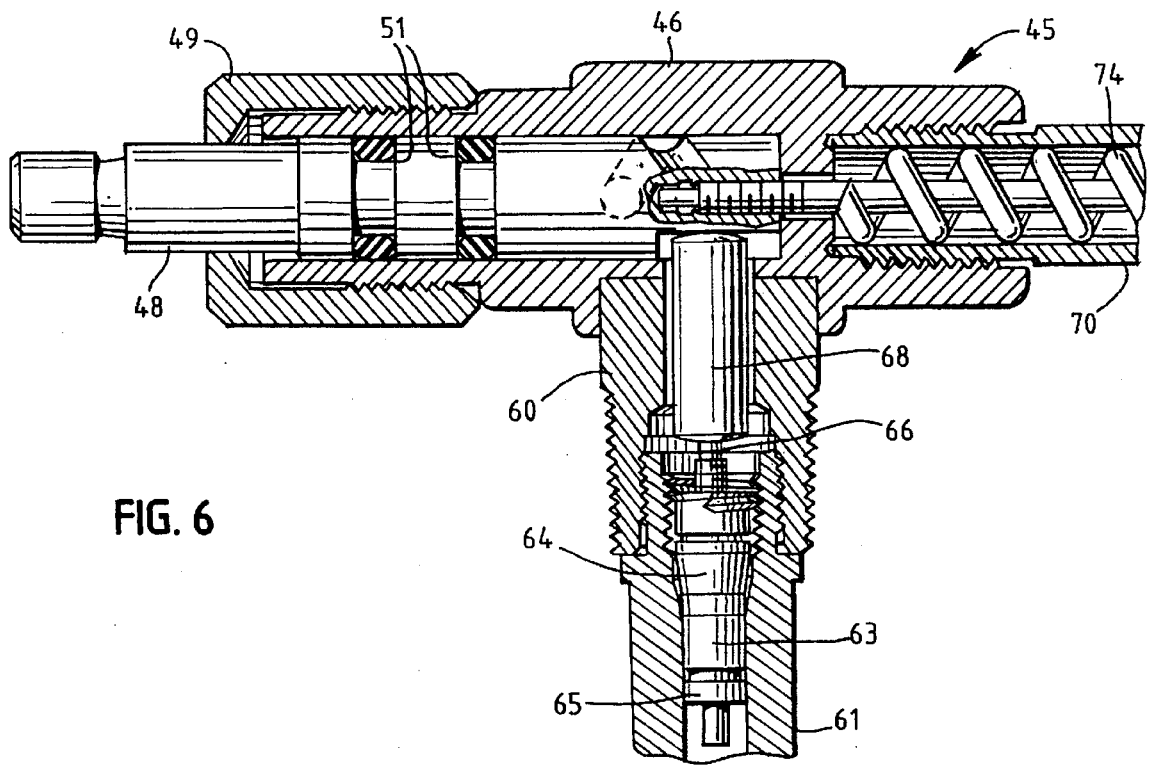
FIG. 6 is an enlarged fragmentary sectional view of the valve assembly.

A generator tube 70 extends forwardly from the valve body in alignment with the valve stem. A gas tip 71 is mounted on the forward end of the generator tube. A rod 72 is screwed into the forward end of the valve stem 48 and extends axially within the generator tube. A needle 73 is mounted on the end of the rod 72 and, in the position illustrated in FIG. 3, is positioned within the fuel orifice or jet of the gas fitting 71. A wire helix 74 is positioned within the generator tube around the rod 72.

As the valve stem 48 moves to the left as viewed in FIG. 3, the needle 73 moves out of the fuel orifice and regulates the amount of gas vapor which flows through the fuel orifice. The generator tube provides a fuel tube from the valve assembly and is associated with a burner assembly of the type described in Reissue Pat. No. 29,457. Movement of the needle 43 relative to the fuel orifice controls the flame and therefore the heat output of the burner assembly. When the needle is in the FIG. 3 position, the needle substantially restricts the fuel orifice, and the burner burns with a low flame. When the valve stem is rotated until the pin 53 engages the forward end of the helical slot 52, the needle is substantially withdrawn from the fuel orifice, and the burner burns with a high flame.

The fuel pickup tube 61 may be provided with an instant light mechanism which is a conventional feature on Coleman liquid fuel campstoves and lanterns. An instant light mechanism for a lantern is described in U.S. Pat. No. 4,552,582. An instant light mechanism relies on pressure differential to incorporate air with the liquid fuel flowing through the fuel pickup tube 61 so that an atomized mixture of air, liquid fuel and fuel vapor flows from the generator tube into the burner assembly. The atomized mixture can be ignited with a match or a spark ignitor.

The valve assembly can be operated by rotating the valve stem 48 from the off position illustrated in FIG. 3 one-half turn to a fully open position in which the burner assembly can be ignited. After the burner assembly is ignited and the generator tube 70 is heated sufficiently to vaporize the fuel in the generator tube, the valve stem 48 can be rotated clockwise to move the needle 73 axially into the fuel orifice of the gas fitting 71 to regulate the flow of fuel vapor through the orifice. Fuel flow through the orifice will be reduced until the follower pin 68 slips from the cylindrical portion 56 of the valve stem into the notched portion 57 and allows the valve core 63 to close.

Since the valve stem and control knob thereon rotates through only 180° from the off position to the fully open position, an index card, decal, or the like can be used to indicate the burner setting. For example, the card or decal can be provided with indicia or words which indicate "off," "med.," and "high" settings. Valve assemblies which require rotation beyond one complete revolution cannot be so labeled.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. In a liquid fuel campstove having a fuel tank and a burner, an improved fuel control means between the fuel tank and the burner for controlling flow of fuel from the fuel tank to the burner, the fuel control means comprising:

a valve body, a elongated valve stem having a generally cylindrical side surface and a longitudinal axis, the stem being rotatably mounted in the valve body for rotation about the longitudinal axis thereof, the stem having a generally helical slot in the side surface thereof which extends for less than 360° around the axis of the stem, the stem including a side surface which has first and second portions, the second portion of the side surface extending radially outwardly beyond the first portion of the side surface, a pin mounted on the valve body and extending into the slot whereby rotation of the stem between first and second rotational positions causes the stem to move axially within the valve body between first and second axial positions, a fuel pickup tube attached to the valve body and extending generally perpendicularly to the axis of the stem, a valve mounted in the fuel pickup tube, the valve including a valve seal movable between a first position in which the valve is closed and a second position in which the valve is open, a follower member extending between the valve and the stem generally perpendicular to the axis of the stem, the follower pin engaging the of the first portion of the side surface of the stem when the stem is in its first rotational position whereby the valve seal is in its first position and the valve is closed, the follower pin engaging the second portion of the side surface of the stem when the stem is rotated out of its first rotational position whereby the follower member moves away from the axis of the stem and moves the valve seal to its second position to open the valve.

2. The campstove of claim 1 in which the valve includes a pin engageable with the follower member for moving the valve seal to its second position when the follower member moves to its second position.

3. The structure of claim 1 including an elongated fuel delivery tube attached to the valve body and aligned with the axis of the stem, an elongated rod attached to the stem and extending within the fuel delivery tube, the rod being movable axially within the fuel delivery tube as the stem moves axially.

4. The structure of claim 3 in which the fuel delivery tube is provided with a fuel outlet orifice and the rod is positioned in the orifice to limit fuel flow therethrough when the stem is in its first axial position and the rod is substantially withdrawn from the orifice when the stem is in its second axial position.

5. The structure of claim 1 in which the helical slot in the stem extends for about 180° around the axis of the stem.

6. The structure of claim 1 in which the slot has a pair of ends which are engageable with the pin to limit rotation of movement of the stem.

7. The structure of claim 1 in which the valve comprises a valve core having an elongated core body, said valve seal being mounted for longitudinal movement relative to the core body between said first and second positions, and a valve pin connected to the valve seal and being engageable with said follower member.

* * * * *

UNITED STATES PATENT AND TRADEMARK OFFICE
CERTIFICATE OF CORRECTION

PATENT NO. : 5,655,512
DATED : August 12, 1997
INVENTOR(S) : Norris R. Long

It is certified that error appears in the above-indentified patent and that said Letters Patent is hereby corrected as shown below:

TITLE PAGE:
Change "[73] Assignee: Wilson Sporting Goods Co., Chicago, Ill."

to --[73] Assignee: The Coleman Company, Inc., Wichita, Kansas--

Signed and Sealed this

Seventeenth Day of March, 1998

Attest:

BRUCE LEHMAN

*Attesting Officer*    *Commissioner of Patents and Trademarks*